US011416940B1

(12) United States Patent
Davidson

(10) Patent No.: US 11,416,940 B1
(45) Date of Patent: Aug. 16, 2022

(54) VEHICLE WITH AUTOMATED INSURANCE PAYMENT APPARATUS

(71) Applicant: Cherith Brook, LLC, Searcy, AR (US)

(72) Inventor: Daniel Scott Davidson, Searcy, AR (US)

( * ) Notice: Subject to any disclaimer, the term of this patent is extended or adjusted under 35 U.S.C. 154(b) by 477 days.

(21) Appl. No.: 15/202,725

(22) Filed: Jul. 6, 2016

Related U.S. Application Data

(60) Provisional application No. 62/189,123, filed on Jul. 6, 2015.

(51) Int. Cl.

| | |
|---|---|
| ***G06Q 10/10*** | (2012.01) |
| ***G06Q 40/08*** | (2012.01) |
| ***B60W 50/04*** | (2006.01) |

(52) U.S. Cl.
CPC .......... *G06Q 40/08* (2013.01); *B60W 50/045* (2013.01); *B60W 2050/046* (2013.01); *B60W 2530/00* (2013.01); *B60W 2540/00* (2013.01)

(58) Field of Classification Search
CPC .......... G06N 5/04; G06Q 30/00; G06Q 40/08; B60W 50/045
USPC .......... 705/4
See application file for complete search history.

(56) References Cited

U.S. PATENT DOCUMENTS

| | | | | |
|---|---|---|---|---|
| 8,595,037 B1 * | 11/2013 | Hyde | G06Q 40/08 | 701/2 |
| 9,031,545 B1 * | 5/2015 | Srey | H04W 4/046 | 455/418 |
| 2008/0281641 A1 * | 11/2008 | Pilzer | G06Q 10/10 | 705/4 |
| 2009/0030795 A1 * | 1/2009 | Winchester | G06Q 20/102 | 705/14.27 |
| 2012/0116876 A1 * | 5/2012 | Graham, Jr. | G06Q 30/02 | 705/14.53 |
| 2012/0316957 A1 * | 12/2012 | Zhou | G06Q 30/08 | 705/14.46 |
| 2013/0294593 A1 * | 11/2013 | Xing | G06Q 30/0241 | 379/114.13 |
| 2014/0214750 A1 * | 7/2014 | Healy | G07C 5/0808 | 706/48 |
| 2015/0039444 A1 * | 2/2015 | Hardin | G06Q 30/0273 | 705/14.69 |
| 2015/0339745 A1 * | 11/2015 | Peter | G06Q 30/0613 | 705/26.42 |

* cited by examiner

*Primary Examiner* — Hai Tran

(57) ABSTRACT

A vehicle with a monitoring device may be used for the adjustment of an insurance policy property by auctioning information obtained about the policy holder and the vehicle. The vehicle monitoring device transmits the information to a marketing provider server that will transform and categorize the information to generate advertisements by third-party businesses directed to the user vehicle. A fee is charged to the third-party business responsible for the advertisement to offset and reduce the insurance premium charged to that policy holder.

28 Claims, 1 Drawing Sheet

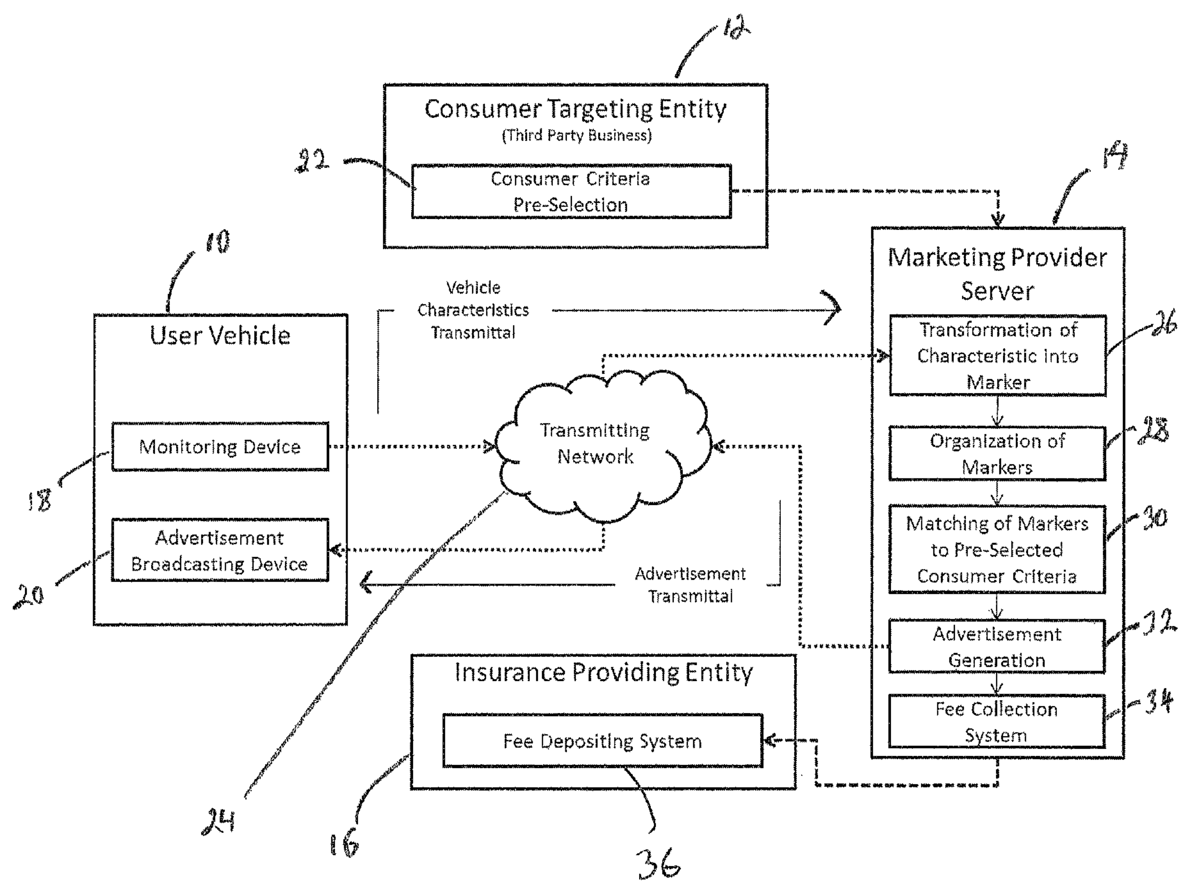
12
Consumer Targeting Entity
(Third Party Business)
22
Consumer Criteria Pre-Selection
14
Marketing Provider Server
10
User Vehicle
Vehicle Characteristics Transmittal
Transformation of Characteristic into Marker
26
Organization of Markers
28
Monitoring Device
Transmitting Network
18
Matching of Markers to Pre-Selected Consumer Criteria
30
Advertisement Broadcasting Device
20
Advertisement Transmittal
Advertisement Generation
32
Insurance Providing Entity
Fee Collection System
34
Fee Depositing System
24
16
36

VEHICLE WITH AUTOMATED INSURANCE PAYMENT APPARATUS

CROSS-REFERENCE TO RELATED APPLICATIONS

This application claims the benefit of U.S. provisional patent application No. 62/189,123, entitled "Vehicle Information Method and System for Payment of Insurance Policy Premiums," filed on Jul. 6, 2015. Such application is incorporated herein by reference in its entirety.

BACKGROUND OF THE INVENTION

The present invention relates to a vehicle with apparatus for the automated payment of insurance premiums or the award of credits towards the payment of insurance premiums.

Auto insurance premiums account for a large monthly and yearly expenditure for the owners of vehicles. For example, according to the National Association of Insurance Commissioners, the average auto insurance expenditure for one vehicle alone in the United States is typically $700-$900 per year. This expenditure is in the form of an insurance premium, which is currently set based on an actuarial analysis of risk factors, including, for example, age, gender, marital status, and the insured's driving record. The premiums may be simply for liability in the case of an automobile accident—coverage which is generally required by law to certain minimums—but may also include "comprehensive" or collision insurance. It is estimated that insured persons not directly involved in an accident could still be paying for nearly 75% of all vehicular accident costs, and most of that payment comes through these insurance premiums collected by the insurance company. Thus, many consumers are burdened with paying high premiums for services that they will never need to use.

With the high price for insurance premiums, some insurance companies have begun to implement cost-saving or premium-reducing promotions to attract persons to their insurance business. For example, many companies are offering "safe driver" reductions in premiums or deductibles. To implement these systems, insurance companies have developed devices that connect to the on-board electronics of a vehicle and monitor the driving technique of the driver to determine the degree of risk of that particular driver. For example, one monitor may record driving habits of the insured driver to include, without limitation, the number of hard braking events the driver incurs, the average speed, the number of times the speed limit is exceeded, and the maximum speed obtained. If the device records habits that are considered safe, the insurance rate for that driver may be decreased or the driver may receive a "reward" in the form of a refund of some amount of the insurance premium paid. On the other hand, if the record reveals driving habits that are deemed to be of higher risk, the insurance rate may not be reduced or could in some cases increase.

With the advancement of technology, some methods have even been developed to base insurance on the use of an autonomous drive mode system. These methods use characteristics of the autonomous drive system (such as model name and manufacture of the autonomous drive system, accuracy of the system, the configuration of the system, etc.) to dynamically change insurance policy properties based on the reduced or increased likelihood of an automobile accident given the accuracy and use of the autonomous driving system. While these existing methods are mindful of the relationship between insurance policy properties and autonomous drive mode selection systems, a method is desired for dynamically changing insurance premiums or other insurance policy properties based not on the risk factors of the driver's driving habits or the change in likelihood of an accident, but instead on vehicle characteristics and other external factors completely independent of the operation of the vehicle. The inventor hereof has recognized that such a method and system would allow insurance premiums and other insurance policy properties to be reduced irrespective of the use of an autonomous driving system and could be used in vehicles that are operated manually, lowering the insurance premium of a wider market of users. Where an autonomous driving system is implemented, however, such an invention could serve to improve the existing technology directed toward reducing the policy payments, and could be capable in certain implementations of eliminating such payments altogether.

BRIEF SUMMARY OF THE INVENTION

The present invention is directed to a vehicle with an automated insurance premium payment apparatus, which may be used for dynamically generating an insurance premium or other insurance policy property. In certain embodiments of the invention, the applicable insurance premium may, for example, be reduced or eliminated entirely. The invention in certain embodiments may be used for many types of insurance policies to reach a wider market of users.

In certain embodiments, the apparatus incorporates an auction system and method to modify premiums, or other properties of an insurance policy, based on its ability to auction marketing opportunities to advertisers based on the behaviors and characteristics of the driver, passengers, vehicle and vehicle environment. The vehicle information auction system is not dependent on an autonomous drive mode system, but instead can be used whether the autonomous drive mode system is enabled or whether the driver is operating the vehicle manually. It is understood that a greater reduction, or even a complete elimination, of premium cost to the user can be achieved in certain embodiments of the invention quicker with autonomous vehicles than manually operated vehicles, but nevertheless the invention is capable of reducing the premium in manually operated vehicles to some degree. As the vehicle is operated, either autonomously or manually, the vehicle information auction system is capable of dynamically changing the insurance policy properties in response to a third party business's interest in the information gathered about the driver, passengers, vehicle, or environment.

BRIEF DESCRIPTION OF THE DRAWING

The figure is a schematic of the overall apparatus, displaying the devices located at the user vehicle, the consumer targeting entity, the marketing provider server, the transmitting network, and the insurance providing entity.

DETAILED DESCRIPTION OF THE PREFERRED EMBODIMENT(S)

The present invention is directed toward a vehicle incorporating an apparatus that is capable of dynamically updating the insurance policy properties of an insured driver by auctioning to third party businesses the right to advertise to the driver and passengers in a particular user vehicle given the information gathered by the system corresponding to user vehicle information, including but not limited to information about the driver, passenger, vehicle, or vehicle environment (collectively, the "user" or the "user vehicle" 10). The characteristics recorded for the driver, passengers, vehicle, vehicle environment, and other characteristics recorded are collectively referred to as "user vehicle characteristics." This information is included in a consumer database, which includes all of the consumer information. For purposes of this invention, examples will be provided with regard to auto insurance policies, but it is understood that this process may be used for other types of insurance policies, such as life insurance, health insurance, disability insurance, worker's compensation insurance, or any other contract or policy based on risk-transference between the policy holder (the insured) and the policy provider. Furthermore, the invention may be applied to "bundled" insurance products that include multiple types of insurance; for example, the insured may sign up for the service described herein in connection with an automobile insurance policy, but may receive a benefit in the form of free or reduced premiums on other types of insurance that are a part of the bundle, such as home, life, and health insurance, either in addition to or in lieu of the reduction or elimination of premiums for the automobile insurance policy. The insurance providing entity 16 may be a corporation, agent, independent contractor, or any entity responsible for satisfying claims under the insurance policy. The policy provider need not necessarily be a traditional insurance company. The terms of such insurance policy, including without limitation premiums and deductibles, may be herein referred to as "insurance policy properties." Although many examples are provided with regard to insurance premiums, it is understood that the present invention can achieve a dynamic update of any and all insurance policy properties. The consumer targeting entities 12 are third party businesses, including without limitation retail chains, restaurants, gas stations, or any other entity that desires to reach consumers through advertisements. They are able to pre-select consumer criteria 22 that are of interest to them, as explained more fully below.

The advertisements generated and directed toward consumers may be interactive or non-interactive advertisements. In one embodiment, interactive advertisements may be used to offer discounts or rewards to the user depending on whether the user responds to the ad in a desired manner. These rewards may be used at the third party business that directed the advertisement or could be used at other businesses. Alternatively, the reward offered may be an additional reduction of the user's insurance premium or other policy property. In one embodiment, the interactive advertisements may take the form of an interactive game. These game advertisements may be played in the vehicle, by interacting with the consumer targeting entity 12 in person, or a combination of in vehicle and in person interaction. These games provide interactive and profitable entertainment for the user and an opportunity for one or more consumer targeting entities to advertise to the user in a way that keeps the user's attention for an extended period of time. Again, the reward for participating in such game may be a discount for the business's goods or services or may be a further reduction in the insurance premium or other policy property.

In one embodiment, the vehicle information auction system is implemented in a standard vehicle either being driven autonomously or manually by an insured driver. One or more monitoring devices 18, either an integral part of the vehicle or an external device incorporated into the vehicle, is capable of recording and reporting pertinent user vehicle 10 characteristics, which for example may include, without limitation, information about the driver, any passengers, the vehicle, and the environment surrounding the vehicle to a consumer database maintained by the insurer or a third party marketing provider. User vehicle 10 characteristics that may be recorded include the vehicle's location, the time of day, the weather in the vehicle's vicinity, the fuel level of the vehicle, the mileage of the vehicle, and businesses within a certain distance of the vehicle's location, among many other characteristics associated with the driver's use of the vehicle. As the user vehicle 10 characteristics are recorded and reported to the consumer database, which is either directly accessible by the insurer or a separate marketing provider, the user vehicle 10 information is transformed into consumer identifying markers by a routine represented at block 26 of the figure, which are then organized into categories based on heuristic combinations of those markers by a routine represented at block 28 and can be matched to pre-selected consumer criteria by a routine represented at block 30 of marketing provider server 14.

A consumer targeting entity 12 who is interested in directing advertisement to a group of consumers with the same or similar user vehicle 10 characteristics as those recorded about the user or user vehicle 10 (as represented by a consumer identifying marker) may pre-select certain consumer criteria 22 which relate to certain categories of user vehicles 10 to which targeted advertisements will be directed. The business contracts with the vehicle information auction system to advertise and promote products and in return is charged for the advertisements of its products or services at a routine represented by block 34 of marketing services provider 14. In one embodiment, multiple businesses are competing against each other to bid for the rights to advertise to a particular segment of consumers. This bidding increases the amount of revenue generated by the right to advertise, which when applied to the insurance policy property by a fee depositing system routine 36 of insurance providing entity 16, increases the savings to the user. The types of products or services to be offered to the consumers are stored in a second database component, the product database. The advertisements are generated at the marketing provider server 14 and transmitted to an advertisement broadcasting device 20 at the user vehicle 10 via the transmitting network 24. In exchange for the ability of consumer targeting entity 12 to direct an advertisement to the particular targeted user whether in real-time or, optionally, at a later time, the third party business will pay a fee to the marketing provider or insurer. The fee will then be credited to a deposit account set up for the insured driver, such that a portion of the fee will pay for a portion of or the entirety of that insured driver's insurance policy premium or other insurance policy property. Where the premium or other policy property is already reduced, for example because of the implementation of an accurate autonomous driving system, the third party business's fee may cover an additional portion or the entire portion of the insurance premium or other insurance property, thereby drastically limiting or completely eliminating the financial burden on the insured user altogether. Since the third-party business sending the advertisement purchases the advertisement based on certain information that is not necessarily personally identifiable information (PII), the system in certain implementations may be operated whereby no PII is ever transmitted to the third-party business, thereby maintaining the privacy of the insured driver.

In certain embodiments, the user vehicle 10 characteristics will be monitored and recorded by one or more monitoring devices 18 constantly and in real-time, with the user vehicle 10 characteristics recorded by the monitoring device 18 preferably transmitted to the consumer database maintained by the insurer or marketing provider through a wireless network 24. To minimize the bandwidth use on the wireless network 24 the system transmits an initial-complete set of characteristics to the server, then only transmits characteristics as they change. A periodic heartbeat signal is used to inform the server that the vehicle is still active even when there are no characteristic changes to transmit. This real-time recording and transmitting of the user vehicle 10 characteristics allows a relevant advertisement to be generated and transmitted to the user or vehicle at the precise moment its relevance is highest. For example, the monitoring device 18 may record that a vehicle's gas tank is only one-quarter full. At the moment the monitoring device 18 records and transmits that information to the consumer database at the insurer or marketing provider, an additional database (the marketing database) maintained by the insurer or marketing provider will instantaneously transform that vehicle characteristic into a consumer identifying marker at block 26 of the figure. For example, the characteristic recorded is that the vehicle has one-quarter of a tank of gas. That characteristic may be transformed, for example, to "low fuel."

The marketing database is capable of segmenting consumers, integrating the internal and external characteristics collected in the consumer database to products stored in the product database. Segmentation of consumers can be based on a number of characteristics including demographic characteristics, geographic characteristics, psychographic characteristics, or behavioral characteristics. Examples of demographic characteristics include age, gender, income, marital status, familial status, spending patterns and other factors. Advertisements based on such information may, for example, direct an advertisement for women's clothing based on gender and income. Segmentation based on geographic characteristics allows the vehicle information auction system to identify and offer selective products or advertisements based on the location of the user. Segmentation based on psychographic characteristics allows the vehicle information auction system to identify and offer products based on the lifestyle of the user. For example, users that are health conscious may be sent advertisements for health foods and gym memberships. Users that enjoy reading books may be sent advertisements for bookstores or places to read, like a coffee shop. The spectrum of possible advertisements generated based on lifestyle is endless and any number of lifestyle characteristics can be used to generate a more targeted advertisement. Segmentation based on behavior characteristics allows the vehicle information auction system to offer advertisements based on the behavioral patterns of the user. For example, if a user drinks coffee regularly in the morning, an advertisement may be generated for a coffee shop.

To demonstrate the segmentation of consumers at the marketing database, consider the example where the user vehicle 10 has only a quarter of a tank of gas. In this example, the vehicle is marked with the "low fuel" marker and may then be placed in the category "Needs Fuel", which may correspond to all users or vehicles that have less than a quarter of a tank of gas (i.e. marked "low fuel"). A third-party business, in this scenario a gas station, may have pre-selected to target advertisements (the product database) to all users or vehicles that fall within that "Needs Fuel" category. To pre-select such a group of individuals would cost the third-party business a certain fee, which in return would be used to help pay for the user's insurance premium or other policy property. As the monitoring device 18 records the characteristic into the consumer database, the characteristic is then transformed to a certain consumer identifying marker via the marketing database which is then matched to a corresponding advertisement from the product database via the marketing provider server 14. The relevant advertisement is then generated at block 32 and instantaneously transmitted back to the vehicle via the wireless network 24 to an advertisement broadcasting device 20 in the vehicle. The advertisement broadcasting device 20 can be a screen, radio, heads-up display, smartphone, or any other device that is capable of visually or audibly relaying information, such as the LED screens that are commonly found on vehicles today to provide navigation, back-up camera display, radio operation, and like functions. Other types of advertisement broadcasting devices 20 may be employed to stimulate other senses. For example, an advertisement for an action movie may generate a vibration in the driver seat corresponding to explosions in the movie. It is understood that multiple advertisement broadcasting devices 20 can be used simultaneously to broadcast an advertisement that appeals to multiple senses at once. For example, an advertisement for an action movie may play a scene from the movie both visually and audibly and may also cause vibrations in the driver seat corresponding to that movie scene.

By using a combination of characteristics, more targeted and direct advertisements can be transmitted. The more targeted advertisements to segmented groups of consumers not only serves to maximize customer reach and product matching, but is also important in reducing "clutter" to the consumer which will drastically improve the effectiveness of the system. In the example above, where the vehicle falls within the "Needs Fuel" category, it is also understood that other user vehicle 10 characteristics can be recorded simultaneously. It is understood that the recording of multiple characteristics by the monitoring device 18 may allow a single user or vehicle to be organized into multiple groups simultaneously by the marketing provider. For example, the monitoring device 18 incorporated into vehicle used in the above example may also record the location of the vehicle simultaneously with the fuel level of the vehicle. Advertisements may be generated based on the location as determined by the business seeking to advertise its products or company. For example, the business may seek to advertise based on general locations, premium locations, special events in the area, or other marketing factors.

In certain embodiments the monitoring device 18 uses technology well-known in the industry to record such location information. For example, GPS monitoring of the vehicle's location may be used to geo-locate the vehicle. Thus, the monitoring device 18 may record that the vehicle is both low on fuel and in the downtown area. The device will transmit that data via the wireless network 24 to the marketing provider which would mark the vehicle as both "low fuel" and "downtown", and then organize the vehicle at block 28 into the "Needs Fuel" (based on the "low fuel" marker) group in addition to the "Downtown" group (based on the "downtown" marker). A third-party business, again a gas station in this scenario, in the downtown area may have pre-selected to target its ads to all users that fall within both the "Needs Fuel" and "Downtown" categories. Thus, that vehicle will receive an advertisement for a gas station in its immediate area at block 32 of marketing provider server 14. In response for that user allowing advertisements to be generated and transmitted to its vehicle, that user's insurance premium will be reduced or eliminated, in part due to the revenue generated from the third-party business purchasing the right to advertise. Any combination of characteristics recorded by the monitoring device 18 can be used to target specific advertisements to a specific group of users. A higher amount of advertisements targeted at a single insured user will ultimately drastically reduce or eliminate the insurance policy property for that particular user. It is also understood that any number of identifying markers 26 may correspond to any number of criteria categories. For example, a record by the monitoring device 18 that a user vehicle 10 is being operated during the winter at an early hour in the morning may be marked as both "cold weather" and "early morning", and both markers may allow the vehicle to be categorized into "Coffee shop" advertisement category. The "early morning" marker 26 is not limited to the "Coffee shop" category, however, and may also allow the vehicle to be categorized into a "Breakfast" category or a "Donut shop" category or any other number of categories that would correspond to a group of consumers that a business may want to advertise to in the early morning hours. Given the high degree of accuracy to which GPS location information and/or cellular tower location information can be generated, it is even possible in certain embodiments to identify a marker 26 that identifies the vehicle as proceeding on a particular street or route that can be matched to a corresponding retailer on that street or any connected streets.

The data and characteristics recorded may, in another embodiment, also be archived and kept as historical data for that driver and vehicle, with periodic uploading of characteristics manually or through a wired network 24 being possible. Instead of directing time-sensitive advertisements to a user at a precise time, this embodiment of the vehicle information auction system will focus more generalized advertisements to a user vehicle 10 based on the historical behavior of the driver and vehicle. For example, if the monitoring device 18 records the vehicle driving the same path every day, more generalized advertisements can be directed to that user on the presumption that the user lives or works along that path. Examples for such general advertisements may include advertisements for grocery stores, gyms, entertainment venues, or other non-time pressing matters that are not necessarily reliant on the real-time characteristics of the user or vehicle. It is understood that a single embodiment incorporating both the real-time data monitoring and the historical data monitoring can be implemented, thereby generating a more complete user profile for even more precise advertisement targeting. The targeted advertisement may be directed to the broadcasting device in the vehicle or via more traditional means. This not only allows the third-party business to get the most relevant adds to the most likely group of users to become customers, but also allows a user to reduce or completely eliminate the corresponding insurance premium.

In another embodiment, it may be seen that the information automatically gathered about the vehicle and driver can be supplemented by information directly supplied by the driver. For example, the driver may volunteer demographic information about the driver as consideration for the discount or a further discount in an insurance policy premium. This information may be combined with information gathered from the vehicle and driving habits of the user as described above to provide even more precise information for the targeting of advertising to that user. Alternatively, the driver may volunteer demographic information about passengers, who may then choose to implement the vehicle auction system in their own vehicles. A recommender system approach can be used to learn even more about the driver if the driver chooses to provide ratings of the advertisements they receive. In another embodiment, the system is also capable of being designed to integrate with various current marketing databases and specific consumer information to allow even better targeting of advertisements. Similarly, the advertisements targeted to the user may take the form of a static or dynamic survey, to which the user enters a response. The user response may then be sent back to the marketing provider in real time or in a batch configuration. A user's completion of a survey may result in additional discounts or rewards, either for a service or product or for a further reduction in the insurance premium or other policy property.

Working together, the consumer database, product database, and marketing database components operate as a technology-based promotional distributor, a system designed to best-match business products and services to end consumers. Each of these database components is designed to integrate the system for advertising, segmentation, and sales. Although the examples given above describe the system of one embodiment considering certain factors, it is understood that the system is capable of matching products to consumers based on numerous dynamic factors. Such dynamic factors may be altered to fit consumer needs (or sales needs) and include, for example, product, pricing, promotions and placement. These factors are considered to be dynamic because they are capable of being adjusted and controlled by the vehicle information auction system. Businesses interested in advertising may elect through the vehicle information auction system to limit their advertisements based on any of these dynamic factors.

For example, a business interested in advertising its product may target a particular group of individuals. The vehicle information auction system allows that business to bid against different companies to generate the advertisement for that particular group of individuals. Allowing the companies to bid to advertise generates the best advertising price for the consumer, which in turn reduces or eliminates the insurance policy property further for that consumer. An example of such embodiment would be that one fast food restaurant could bid against another fast food restaurant to advertise its product instead of the other restaurants product. This would be especially useful if the restaurants were located close to one another and the consumer would be inclined to choose one over the other based on the advertisement generated.

In another embodiment, the vehicle information auction system is capable of dynamically pricing goods and services to consumers if a business so desires. Price quotes and advertisements can be adjusted in real-time for the consumer based on any number of user characteristics or other factors, including the user's payment for a premium membership, the user's previous use of the system, or other personal user characteristics (as described above). In addition to determining what products or prices to advertise to the user vehicle 10, the system in another embodiment is also capable of determining the most appropriate form of advertisement or promotional materials to transmit to that user based on the user characteristics recorded and the desires of the business. For example, in one embodiment the system is capable of determining whether a picture or video should be sent to the user based on the advertisement. Other embodiments are capable of generating music or other promotional approaches.

In another embodiment, consumer targeting entities that prefer to play a more active role in the auction process can interact programmatically with the marketing provider server 14 via the MPAPI (Marketing Provider Application Programming Interface). Third party entity software clients can interact with MPAPI via standard network REST like operations GET and POST and PUT or equivalent operations. All operations are communicated securely and require authentication and authorization. GET operations restrict their results according to the privileges and third party making the request. GET requests listed here can also take the form of proactive push type notifications back to the marketing provider. GET operations include, but are not limited to, a request for status of active auctions, a request for auctions won/lost during a given time period, a request for vehicle details and advertisement history for vehicles within a defined geographic area, a request for vehicle details and advertisement history for vehicles when the vehicle is travelling outside its "normal" geographic area, a request for vehicle details and advertisement history for vehicles that meet any other observable vehicle criteria, and a request for feedback from vehicles in response to an advertisement, which may be in the form of a direct user response (such as an up vote or down vote) or in the form of observable changes in the vehicle that may be in response to the advertisement. POST operations include, but are not limited to, bidding to participate in an auction and sending a dynamically generated message to the user vehicle 10 when an auction is won. The generated message may be in any of the audial, visual, or sensory forms previously described.

Unless otherwise stated, all technical and scientific terms used herein have the same meaning as commonly understood by one of ordinary skill in the art to which this invention belongs. Although any methods and materials similar or equivalent to those described herein can also be used in the practice or testing of the present invention, a limited number of the exemplary methods and materials are described herein. It will be apparent to those skilled in the art that many more modifications are possible without departing from the inventive concepts herein.

All terms used herein should be interpreted in the broadest possible manner consistent with the context. When a grouping is used herein, all individual members of the group and all combinations and subcombinations possible of the group are intended to be individually included. When a range is stated herein, the range is intended to include all subranges and individual points within the range. All references cited herein are hereby incorporated by reference to the extent that there is no inconsistency with the disclosure of this specification.

The present invention has been described with reference to certain preferred and alternative embodiments that are intended to be exemplary only and not limiting to the full scope of the present invention, as set forth in the appended claims.

The invention claimed is:

1. A user vehicle system operable to automatically adjust an automobile insurance premium record, comprising:

a. a user vehicle comprising a plurality of monitoring devices and a display device, wherein said monitoring devices are each configured to record at least one of a plurality of user vehicle characteristics during real-time operation of said user vehicle;

b. a transmitting network in communication with each of the plurality of monitoring devices;

c. a provider server in communication with the transmitting network, wherein the provider server comprises a fund collecting system wherein each of the plurality of monitoring devices of the user vehicle are configured to transmit the plurality of user vehicle characteristics to the provider server by means of the transmitting network in real time while the vehicle is in operation;

d. at least one consumer targeting entity server in communication with the provider server, the at least one consumer targeting entity server comprising a plurality of display messages; and e. an insurance providing entity server in communication with the provider server, wherein the insurance providing entity server comprises a funds depositing system, wherein said fund depositing system is configured to collect a fee from said consumer targeting entity server, and wherein said fee is transmitted via said transmitting network to said funds depositing system of said insurance providing entity server, further wherein said funds depositing system is configured to deposit said fee from said consumer targeting entity server into a deposit account, wherein said deposit account is configured to pay an insurance policy property to said insurance providing entity server on behalf of an insurance policy holder, and wherein in exchange for the fee collected from said consumer targeting entity server the provider server is configured to transmit one of the plurality of display messages associated with said consumer targeting entity server to the display device of said user vehicle in real time.

2. The system of claim 1, wherein at least one of said plurality of monitoring devices is an integral part of said user vehicle.

3. The system of claim 1, where at least one of said plurality of monitoring devices is an external monitoring device, wherein said external monitoring device is removably attached to said user vehicle.

4. The system of claim 1, wherein said provider server is configured to transform said plurality of user vehicle characteristics into a plurality of consumer identifying markers.

5. The system of claim 4, wherein said consumer targeting entity server is configured to pre-select a plurality of targeted consumer criteria, wherein said plurality of pre-selected targeted consumer criteria corresponds to said plurality of consumer identifying markers.

6. The system of claim 1, further wherein said at least one consumer targeting entity server is configured to interact with said provider server via a provider application programming interface by a plurality of representational state transfer (REST) operations.

7. The system of claim 6, wherein said at least one consumer targeting entity server is configured to purchase a number of auctions, wherein a plurality of said number of auctions are active auctions, and wherein said plurality of representational state transfer operations comprises a request for an operational status corresponding to said active auctions.

8. The system of claim 6, wherein said at least one consumer targeting entity server is configured to bid on a plurality of auctions, further wherein if said at least one consumer targeting entity server has won at least one of said number of said auctions or lost at least one of said number of said auctions, said plurality of representational state transfer operations comprises a request for a total number of auctions lost and auctions won.

9. The system of claim 6, further comprising a plurality of user vehicles, and wherein said plurality of representational state transfer operations comprises a request for a plurality of details corresponding to a subset of said plurality of user vehicles located within a defined geographical area.

10. The system of claim 6, further comprising a plurality of user vehicles, and wherein said plurality of representational state transfer operations comprises a request for a plurality of details corresponding to a subset of said plurality of user vehicles located outside of a pre-defined normal geographic area.

11. The system of claim 6, further comprising a plurality of user vehicles, and wherein said plurality of representational state transfer operations comprises a request for a plurality of details corresponding to a subset of said plurality of user vehicles that meet a pre-defined observable vehicle criterion.

12. A real-time method for communicating between a provider server and a user vehicle said method comprising the steps of:

a. recording in real time at said user vehicle via at least one vehicle monitoring device a plurality of user vehicle characteristics;

b. transmitting in real time said plurality of user vehicle characteristics from said at least one vehicle monitoring device to a provider server via a transmitting network;

c. transforming at said provider server said plurality of user vehicle characteristics into a plurality of consumer identifying markers corresponding to said plurality of user vehicle characteristics;

d. organizing at said provider server said consumer identifying markers into a plurality of designated consumer categories;

e. matching said plurality of designated consumer categories to a plurality of targeted consumer criteria, wherein a number of said plurality of targeted consumer criteria is pre-selected by a consumer targeting entity server;

f. collecting at said provider server an amount of funds from said consumer targeting entity server, wherein said amount of funds collected corresponds to said number of said plurality of targeted consumer criteria pre-selected by said consumer targeting entity server;

g. in exchange for said amount of funds collected from said consumer targeting entity server, generating at said provider server a message corresponding to said plurality of targeted consumer criteria;

h. in exchange for said amount of funds collected from said consumer targeting entity server, transmitting in real time said message to a display device in said user vehicle via said transmitting network;

i. in exchange for said amount of funds collected from said consumer targeting entity server, broadcasting in real time at said user vehicle the generated message via said display device;

j. providing a portion of said amount of funds collected from said consumer targeting entity server to an insurance providing entity server; and k. crediting said portion of said amount of funds to a deposit account maintained by said insurance providing entity server on behalf of said insurance policy holder in exchange for receiving said message at said display device at said user vehicle, thereby reducing a payment amount for which said policy holder is responsible.

13. The method of claim 12, wherein said insurance policy property comprises an insurance premium.

14. The method of claim 12, wherein said insurance policy property comprises an insurance deductible.

15. The method of claim 12, wherein said plurality of user vehicle characteristics comprises information related to a location of said vehicle.

16. The method of claim 12, wherein said plurality of user vehicle characteristics comprises vehicle environment data.

17. The method of claim 16, wherein said vehicle environment data comprises information corresponding to a plurality of local businesses, wherein said plurality of local business are located within a specified distance of said user vehicle.

18. The method of claim 12, wherein said plurality of user vehicle characteristics comprises a plurality of insured characteristics.

19. The method of claim 18, wherein said plurality of insured characteristics comprises demographic information provided by the insured policy holder.

20. The method of claim 12, wherein said plurality of user vehicle characteristics comprises passenger characteristics.

21. The method of claim 12, wherein said transmitting of said plurality of user vehicle characteristics to a provider server via a transmitting network step occurs in real-time.

22. The method of claim 12, wherein said transmitting of said plurality of user vehicle characteristics to a provider server via a transmitting network step occurs at a specific transmitting time, wherein said specific transmitting time is determined by said insurance policy holder.

23. The method of claim 12, further wherein said consumer targeting entity server interacts with said provider server via a provider application programming interface via a plurality of representational state transfer (REST) operations.

24. The method of claim 23, wherein said consumer targeting entity server has purchased a number of auctions, wherein a plurality of said number of auctions are active auctions, and wherein said plurality of representational state transfer operations comprises a request for an operational status corresponding to said active auctions.

25. The method of claim 23, wherein said consumer targeting entity server has bid on a number of auctions, further wherein said consumer targeting entity server has won a number of said auctions, further wherein said consumer targeting entity server has lost a number of said auctions, and wherein said plurality of representational state transfer operations comprises a request for a total number of auctions lost and auctions won.

26. The method of claim 23, wherein said plurality of representational state transfer operations comprises a request for a plurality of details corresponding to a number of user vehicles within a defined geographical area.

27. The method of claim 23, wherein said plurality of representational state transfer operations comprises a request for a plurality of details corresponding to a number of user vehicles outside of a pre-defined normal geographic area.

28. The method of claim 23, wherein said plurality of representational state transfer operations comprises a request for a plurality of details corresponding to a number of user vehicles that meet a pre-defined observable vehicle criterion.

* * * * *